United States Patent [19]
Tonissen

[11] Patent Number: 4,913,279
[45] Date of Patent: Apr. 3, 1990

[54] SELF CLEANING CONVEYOR ROLLER

[76] Inventor: George M. Tonissen, P.O. Box 405, Lincoln City, Oreg. 97367

[21] Appl. No.: 204,981

[22] Filed: Jun. 10, 1988

Related U.S. Application Data

[63] Continuation-in-part of Ser. No. 19,527, Feb. 26, 1987, abandoned.

[51] Int. Cl.⁴ .............................................. B65G 45/00
[52] U.S. Cl. .................................. 198/498; 198/806; 198/842
[58] Field of Search ............... 198/498, 840, 842, 806, 198/669, 666

[56]         References Cited
U.S. PATENT DOCUMENTS 2,801,733  8/1957  Evert .................................. 198/498
2,886,169  5/1959  Calder ................................ 198/498
4,180,155  12/1979 Stevick .............................. 198/498
4,499,992  2/1985  Paulson et al. ................... 198/498

FOREIGN PATENT DOCUMENTS 0024276  7/1972  Austria ............................... 198/666
1341969  9/1963  France ............................... 198/666
0631401  11/1978 U.S.S.R. ............................ 198/498
0910804  11/1962 United Kingdom ............... 198/498

Primary Examiner—Robert J. Spar
Assistant Examiner—Lyle Kimms
Attorney, Agent, or Firm—Charles N. Hilke

[57]                ABSTRACT

This invention is a conveyor belt roller, including a pair of oppositely solid formed plates between circular plates affixed along a shaft for sweeping debris in axial direction.

3 Claims, 2 Drawing Sheets

SELF CLEANING CONVEYOR ROLLER

This is a continuation-in-part of co-pending application Ser. No. 019,527, filed on Feb. 26, 1987, now abandoned.

BACKGROUND OF THE INVENTION

1. Field of the Invention

This invention relates generally to industrial machinery that employs conveyor belts for the movement of product materials. More specifically, it relates to rollers that support a conveyor belt, and around which the endless belt travels as the roller rotates.

2. Description of Prior Art

It is well known that, in many industries, a considerable amount of debris falls upon the inner side of the belt, from where it is then carried under the end roller, where is gradually accumulates as the roller continues to rotate. Some of the debris nearest the opposite ends of each roller may possibly fall out, in time; however, the debris under the center of each end roller gradually increases in thickness, so that the belt crown, extending along the center of the belt, becomes stretched and deformed in time, destroying the belt's efficiency. This occurs particularly in industries wherein granular materials are carried on the belts. In order to prevent such wear on the belt, the conveyor must be periodically stopped, for being cleaned, resulting in loss of production time. This situation is, accordingly, in want of an improvement.

SUMMARY OF THE INVENTION

Therefore, it is a principal object of the present invention to provide a conveyor belt roller that is self cleaning, so as to eliminate the need of stopping the machinery periodically, in order to clean up debris collected under the end belt roller.

Another object is to provide a self cleaning conveyor belt roller which eliminated the cost of frequent belt replacement, or loss of production time and business profit.

Yet another object is to provide a self cleaning conveyor belt roller, which, in one design thereof, additionally washes the belt surface, so as to dislodge debris that is sticky or gummy and adheres to the belt, such as in agricultural industries, handling fruits and vegetables, that leave juicy pulp on the belt.

Other objects are to provide a self cleaning conveyor belt roller, that needs no special servicing, is inexpensive, rugged in construction, and efficient in operative use.

These, and other objects, will become readily evident, upon a study of the following Specification, and the accompanying Drawings.

DETAILED DESCRIPTION

Figure 1:
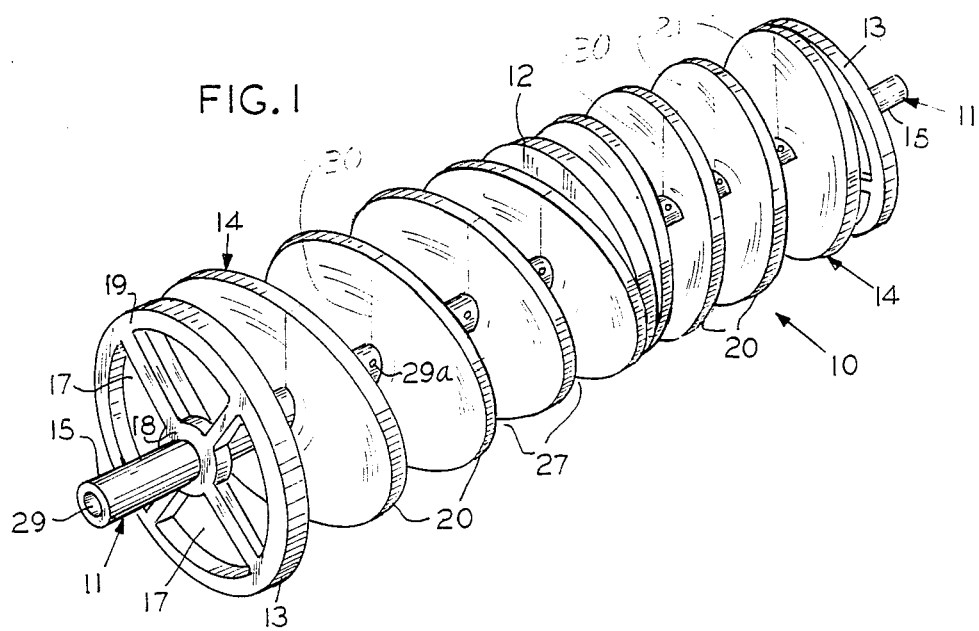
FIG. 1 is a perspective view of a self cleaning conveyor roller, shown in accordance with the present invention.

Referring now to the Drawings in greater detail, the reference numeral 10 represents a self cleaning conveyor roller, according to the present invention, which is made from an elongated shaft 11, a circular central plate 12 on the shaft, a pair of belt support plates 13, with openings for debris to fall clear of a belt, and a pair of augers 14, each one of which is positioned between one of the end plates and the central plate, the components being welded together and to the shaft to form a single rigid assembly. All the components are made of plate steel, so that the roller can support a heavy load. The shaft is straight, having opposite ends 15, that may be rotatably supported in suitable bearings. The circular central plate comprises a solid, heavy, flat disc, having no openings therethrough except for a central opening, through which the shaft was inserted, and welded at its center therein. The end plates are made in like manner, except that each is welded on the shaft at a spaced distance from the shaft ends, so as to leave the portions 15 for support in the bearings. Also, each end plate includes a plurality of large openings 17 therethrough, for allowing debris to be freely moved therethrough. The openings 17 are all located between a hub portion 18, through which the shaft extends, and a peripheral portion that forms a circular rim 19. Spokes 16 connect the hub portion 18 with the circular rim 19. Each auger comprises solid formed slates 21, having a plurality of turns 20, and which has the same circular outer diameter as the plates 12 and 13. The solid formed plates 21 at each end of the auger 14 are welded by weld 22 to the circular central plate 12 and the belt support plates 13.

Figure 2:
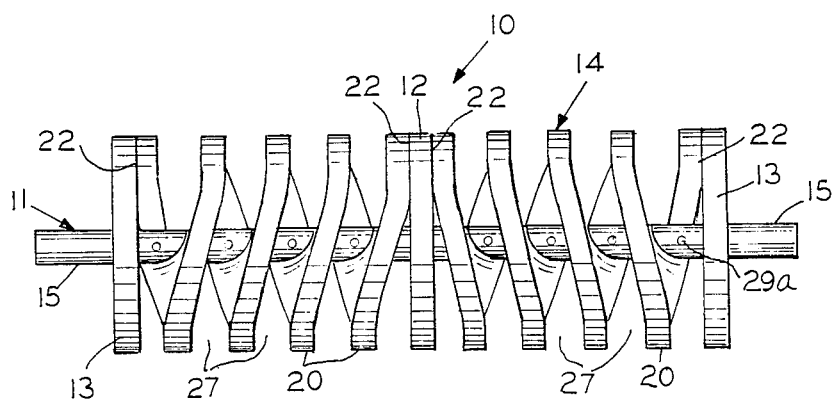
FIG. 2 is a front elevational view of the invention.
Figure 4:
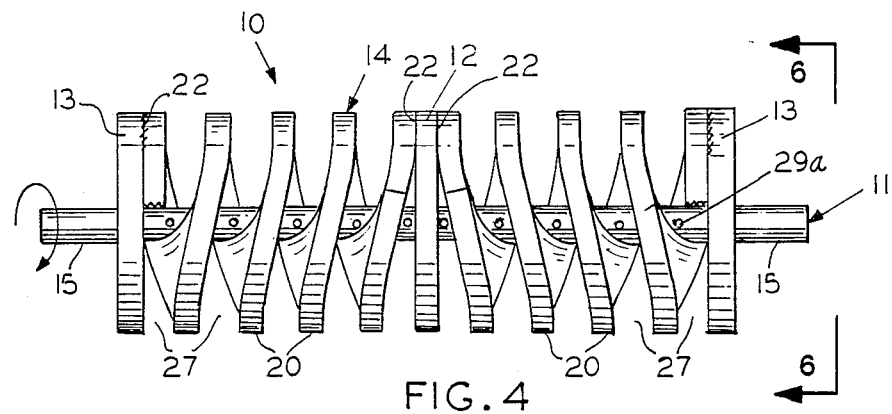
FIG. 4 is another front elevational view of the invention.
Figure 5:
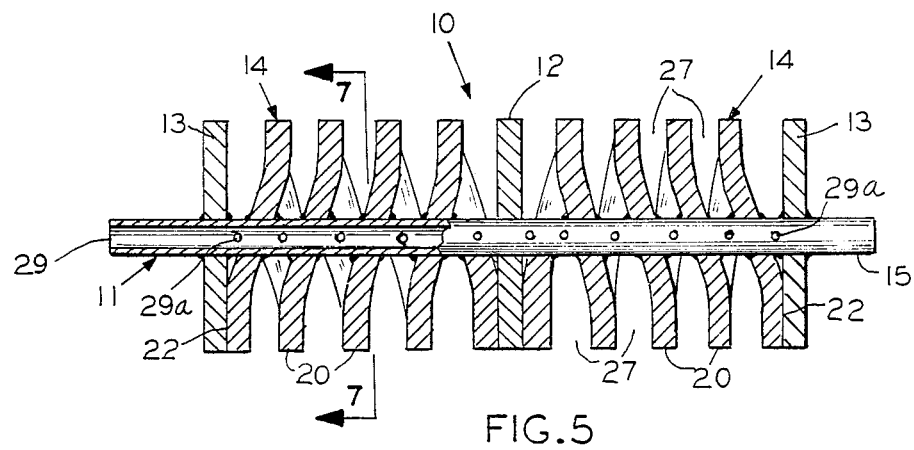
FIG. 5 is yet another front elevational view of the invention.
Figure 6:
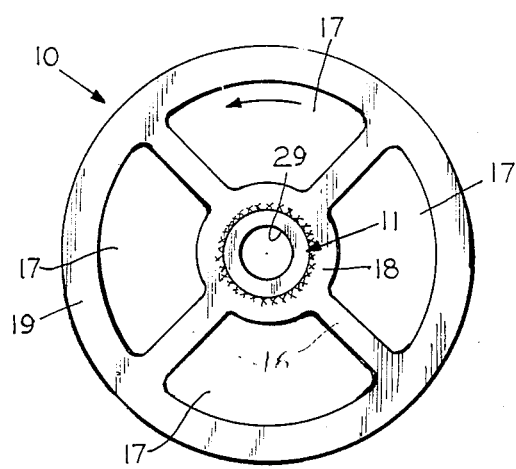
FIG. 6 is an enlarged end view of the invention along lines 6—6.

As clearly shown in FIGS. 2, 4 and 5, the roller is made with each of the two augers being spiralled in opposite directions, one spiralling clockwise, and the other counter clockwise.

Figure 3:
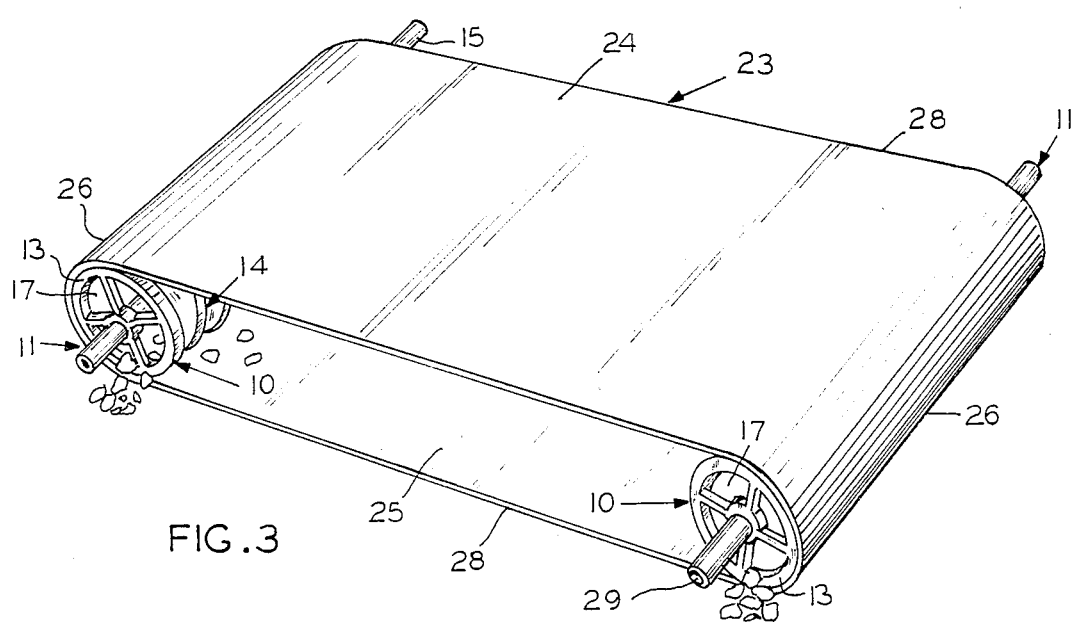
FIG. 3 is a fragmentary perspective view of two rollers, as they are used in a conveyor system.

As shown in FIG. 3, a pair of spaced-apart self cleaning conveyor rollers 10 are mounted upon a conveyor frame, and an endless belt 23 is installed around the two rollers, so that the belt forms a straight upper run portion 24 and a lower run portion 25 between the rollers, while a semi-circular portion 26 thereof extends around the outer side of each of the rollers. During operation of the conveyor, the belt travels around the two rotating rollers, so that material placed upon the top run is carried from one roller (which serves as a tail roller) toward the other (which serves as a head roller). Accordingly any debris that falls upon the top of the lower run tends to accumulate under the tail roller, if such roller is of conventional type. However, if the tail roller is of self cleaning type, the debris arriving under the tail roller is immediately moved in transverse directions by means of the spiral augers; each rotating so that its spiral turns advance toward an opposite outer end of the roller. Thus, any debris arriving in the space 27 formed between the turns 20 of the solid formed plates 21 is advanced away from the belt crown and toward the belt side edges 28, from where it drops off. Each auger, accordingly, sweeps the debris off one half of the belt. The head roller, likewise, can sweep off the underside of the top run as it becomes belt portion 26, removing any sticky debris.

In this design, a central opening 29 in the shaft 11 delivers water from a water supply to a series of radially extending outlets 29a along a side of the shaft 11, for spraying stuck debris from the belt. Shaft 11 can be a solid shaft or a hollow shaft.

Figure 7:
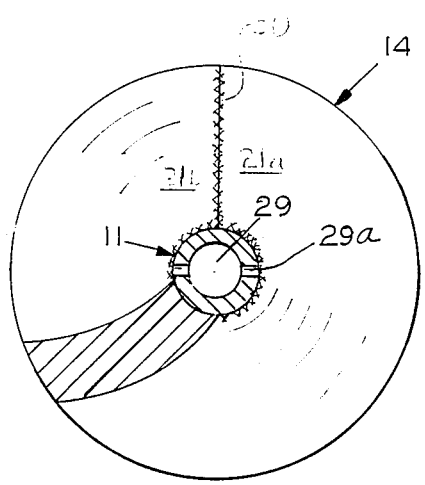
FIG. 7 is an enlarged view of two solid formed plates joined together along lines 7—7 of FIG. 5.

Reviewing FIG. 7, successive solid formed plates 21a and 21b are joined together along weld line 30. A series of solid formed plates 21 form the auger 14. The self-cleaning conveyor roller 10 comprises a shaft 11, a belt support plate 13 located near each opposite end 15 of the shaft 11, a circular central plate 12 located at the center of the shaft 11 and two augers 14 formed by successive solid formed plates 21. Note that one auger 14 is a left auger and the other auger 14 is a right auger.

While various changes may be made in the detail construction, it is understood that such changes will be within the spirit and scope of the invention as is defined by the appended claims.

What I now claim is:

1. A self-cleaning conveyor belt roller, comprising, in combination,
   a plurality of spaced-apart, circular belt support plates with openings, affixed on a shaft;
   a solid circular central plate affixed on said shaft between said support plates; and
   a plurality of plates, affixed on said shaft between said support plates where each plate has a spiral flight portion extending around said shaft, joined together to form a continuous spiral such that the direction of the spiral on one side of said solid circular central plate is opposite from the other side of said solid circular central plate so debris are carried away from said solid circular central plate and toward said circular belt support plates for elimination through said openings of said circular belt support plates.

2. A self-cleaning conveyor belt roller of claim 1 where said circular belt support plates, said solid circular central plate, and said plates are equal in outer diametrical size.

3. A self-cleaning conveyor belt roller, comprising, in combination,
   two spaced-apart circular belt support plates with openings, affixed on a shaft;
   one solid circular central plate affixed on said shaft between said two circular belt support plates; and
   a plurality of plates, affixed on said shaft between said support plates where each plate has a spiral flight portion extending around said shaft, joined together to form a continuous spiral such that the direction of the spiral on one side of said solid circular central plate is opposite from the other side of said solid circular central plate so debris are carried away from said solid circular central plate and toward said circular belt support plates for elimination through said openings of said circular belt support plates.

* * * * *